United States Patent [19]
Jakoubovitch

[11] Patent Number: 5,953,201
[45] Date of Patent: Sep. 14, 1999

[54] CAPACITORS WITH THROUGH-BORES FOR FASTENING MEANS

[76] Inventor: Albert Jakoubovitch, FOS, F-34320 Roujan, France

[21] Appl. No.: 08/945,573
[22] PCT Filed: Feb. 6, 1997
[86] PCT No.: PCT/FR97/00236
    § 371 Date: Apr. 13, 1998
    § 102(e) Date: Apr. 13, 1998
[87] PCT Pub. No.: WO97/29495
    PCT Pub. Date: Aug. 14, 1997
[51] Int. Cl.⁶ ........................................... H01G 4/38
[52] U.S. Cl. ........................... 361/303; 361/328; 361/329
[58] Field of Search ................... 361/303–306.3, 361/328–330, 734, 810, 811, 829–831, 715–716, 821, 822, 823, 699, 677, 676

[56] References Cited

U.S. PATENT DOCUMENTS

| | | | |
|---|---|---|---|
| 4,211,957 | 7/1980 | Alley et al. | 315/276 |
| 4,499,524 | 2/1985 | Shioleno | 361/320 |
| 5,214,564 | 5/1993 | Metzler et al. | 361/328 |
| 5,367,431 | 11/1994 | Kunishi et al. | 361/502 |
| 5,812,365 | 9/1998 | Jakoubovitch | 361/328 |

FOREIGN PATENT DOCUMENTS

| | | |
|---|---|---|
| WO9107075 | 5/1991 | WIPO . |
| WO9213355 | 8/1992 | WIPO . |
| WO9317439 | 9/1993 | WIPO . |
| WO 95/22155 | 8/1995 | WIPO . |
| WO9522155 | 8/1995 | WIPO . |
| WO9629714 | 9/1996 | WIPO . |
| WO97/29495 | 8/1997 | WIPO . |

*Primary Examiner*—Kristine Kincaid
*Assistant Examiner*—Anthony Dinkins
*Attorney, Agent, or Firm*—Frijouf, Rust & Pyle, P.A.

[57] ABSTRACT

A device for connecting a capacitor between a first and a second bus bar. The device includes a first and a second aperture extending through a first and a second electrode of the capacitor. A first and a second fastener extends through the first and second apertures to engage with the first and second bus bars for securing the capacitor to the bus bars to provide electrical and thermal conduction therebetween.

12 Claims, 1 Drawing Sheet

CAPACITORS WITH THROUGH-BORES FOR FASTENING MEANS

BACKGROUND OF THE INVENTION

1. Field of the Invention

This invention relates to electricity and more particularly to an apparatus for mounting and cooling capacitors.

2. Prior Art Statement

There are several types of apparatuses used for the conduction cooling of a capacitor. One specific application for conduction cooled capacitors is for inductive heating applications. Typically, a conduction cooled capacitor is in a form of a parallelogram which represents their usual form, cooling is performed on the largest faces. These faces are located an the opposite sides of the capacitor. The cooling means for the copper plates used as collectors result in large overall dimensions when several banks are connected in series or in parallel. When several capacitors are paralleled between two plates, replacing one capacitor requires the dismantling of the entire bank.

French patent application 92/02329 filed Feb. 26,1992 (PCT Intrational Publication WO 93/17439) shows a capacitor being cooled by two cooling fins contacting two bus bars. The two fins provide electrical conductors and capacitor cooling means. This type of capacitor straddles two metal bars which are used both to cool the capacitors and to collect the current which they deliver.

Therefore, it is an object of the invention to provide a device for connecting a capacitor between a first and a second bus bar which reduces the overall dimensions and weight of the capacitor bank.

Another object of the invention is to provide a device for connecting a capacitor between a first and a second bus bar which provides a major part of a capacitor face unto the bus bar for improving the cooling of the capacitor.

Another object of the invention is to provide a device for connecting a capacitor between a first and a second bus bar which dominates the thermal barrier formed by the fins of the prior art thus improving the cooling of the capacitor.

Another object of the invention is to provide a device for connecting a capacitor between a first and a second bus bar wherein the capacitors are directly bolted to the cooling bars.

Another object of the invention is to provide a device for connecting a capacitor between a first and a second bus bar wherein the assembly and removal of the capacitor from the bus bars become extremely easy.

Another object of the invention is to provide a device for connecting a capacitor between a first and a second bus bar wherein capacitor elements may be removed or added without any intervention being required on the remainder of the bank.

Another object of the invention is to provide a device for connecting a capacitor between a first and a second bus bar with a reduced overall dimension.

Another object of the invention is to provide a device for connecting a capacitor between a first and a second bus bar which is compatible with the system described in French Parent 95/03586 filed Mar. 23, 1995 (PCT International Publication WO 96/29714).

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to a device for connecting a capacitor between a first and a second bus bar. The first and second bus bas are located in a parallel spaced apart relationship. The capacitor has a first and a second electrode separated by a dielectric. A first and a second aperture extends through the first and second electrodes, respectively. A first and a second fastener is located in the first and second apertures to engage with the first and second bus bars for securing the first and second electrodes of the capacitor to the first and second bus bars to provide electrical and thermal conduction between the first and second electrodes of the capacitor and the first and second bus bars, respectively.

Each of the first and second bus bars is formed from a thermally and electrically conductive metal. Each of the first and second electrodes is a solid metallic electrodes. A dielectric element is located between the first and second solid metallic electrodes.

In a more specific example of the invention, the first and the second electrodes directly engage the first and the second bus bar, respectively. The first and second fasteners includes a first and a second threaded fastener such as threaded bolts. A first and a second threaded bare is defined in the first and second bus bars, respectively. The first and second threaded fasteners threadably engage with the first and second threaded bores for securing the first and second electrodes of the capacitor to the first and second bus bars.

Preferably, a first and a second channel defined in the first and second bus bars for receiving a cooling fluid for cooling the first and second bus bars, respectively.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
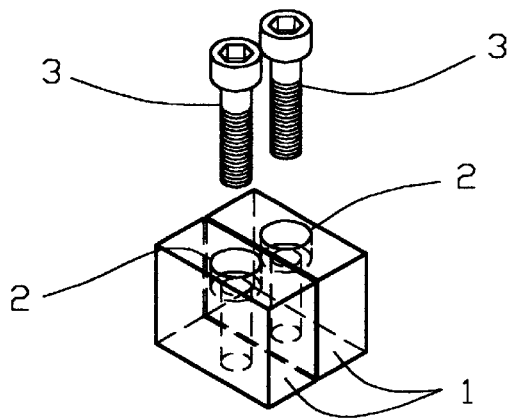
FIG. 1 is an isometric view of a capacitor of the present invention.
Figure 2:
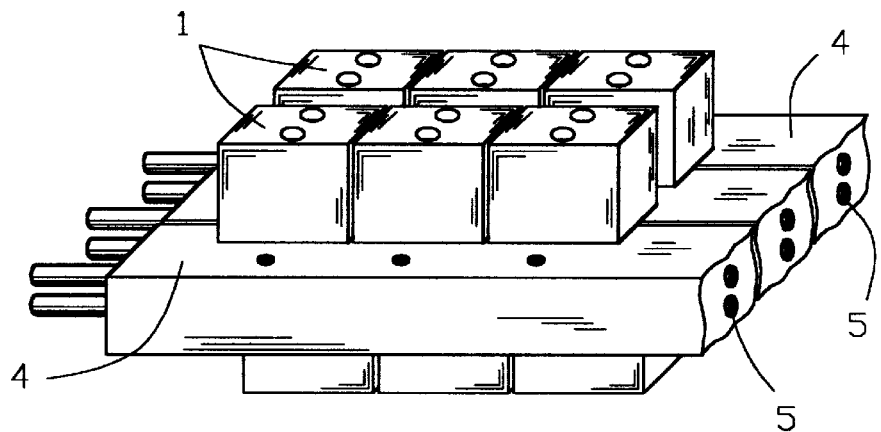
FIG. 2 is an isometric view of the capacitor of FIG. 1 mounted between two bus bars shown as water-cooled metal plates.

FIGS. 1 and 2 shows a capacitor in accordance with the present invention. FIG. 2 is illustrates the capacitor of FIG. 1 mounted between two bus bars. Typically the two bus bars are conduction cooled for cooling the capacitor for inductive heating applications.

Figure 3:
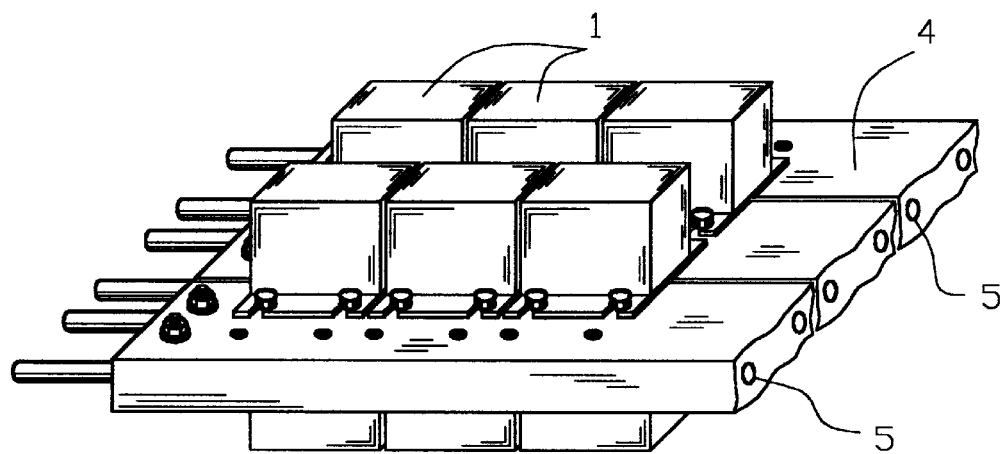
FIG. 3 is an isometric view of a prior art capacitor mounted between two bus bars.

FIG. 3 is an isometric view of a PRIOR ART capacitor 101 mounted between two bus bars 112 and 113. The prior art capacitor 101 is described in French patent application 92/02329 filed Feb. 26, 1992 (PCT International Publication WO 93/17439). The capacitor 101 is cooled by the two cooling fins 104 contacting the two bus bars 112 and 113.

The capacitor of the present invention shown in FIGS. 1 and 2 comprises a first and a second solid metal electrode 1 between which the capacitor dielectric elements are connected. A hole 2 is bored in each electrode 1 for receiving a bolt 3 to secure the capacitor on collector bars 4 cooled via channels 5 through which a cooling fluid is circulated.

The method used herein and in cooling the capacitor edgewise. The thermal contact between the capacitor and the cooling bar 4 is effected on the whole surface of the largest face or at least on the major part of a face.

This embodiment and way of fastening allows mounting the capacitors side by side into a bank within a much smaller space than the system described in French patent application 92/02329 filed Feb. 26, 1992 (PCT International Publication WO 93/17439) thanks to the removal of the fins 104.

The direct bolting of the capacitor onto the cooling bars 4 eliminates the thermal barrier formed by the fins 104, thus improving the capacitor cooling.

The assembly and removal of the capacitor thus mounted become extremely easy since one just needs to unscrew two bolts 3 to remove or add an element without any intervention being required on the remainder of the bank. Of course, each electrode may be provided with several through holes with the corresponding bolts when the electrode size so requires.

The method herein is compatible with the system described in French patent applicaton 92/02329 filed Feb. 26, 1992 (PCT International Publication WO 93/17439), whose overall dimensions are considerably reduced by its use.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What I claim is:

1. A device for connecting a capacitor between a first and a second bus bar, comprising:

said first and second bus bars being located in a parallel spaced apart relationship;

said capacitor having a first and a second electrode separated by a dielectric;

a first and a second aperture extending through said first and second electrodes, respectively; and a first and a second fastener located in said first and second apertures to engage with said first and second bus bars, respectively, for securing said first and second electrodes of said capacitor to said first and second bus bars, respectively, to provide electrical and thermal conduction between said first and second electrodes of said capacitor and said first and second bus bars, respectively.

2. A device for connecting a capacitor between a first and a second bus bar as set forth in claim 1, wherein each of said first and second bus bars is formed from a thermally and electrically conductive metal.

3. A device for connecting a capacitor between a first and a second bus bar as set forth in claim 1, wherein said first and said second electrode directly engage said first and said second bus bar, respectively.

4. A device for connecting a capacitor between a first and a second bus bar as set forth in claim 1, wherein each of said first and second electrodes is a solid metallic electrode.

5. A device for connecting a capacitor between a first and a second bus bar as set forth in claim 1, wherein said first and second fasteners include a first and a second threaded fastener.

6. A device for connecting a capacitor between a first and a second bus bar as set forth in claim 1, wherein said first and second fasteners include a first and a second threaded bolt.

7. A device for connecting a capacitor between a first and a second bus bar as set forth in claim 1, including a first and a second threaded bore in said first and second bus bars, respectively; and said first and second fasteners including a first and a second threaded fastener for threadably engaging with said first and second threaded bores for securing said first and second electrodes of said capacitor to said first and second bus bars.

8. A device for connecting a capacitor between a first and a second bus bar as set forth in claim 1, including a first and a second channel in said first and second bus bars for receiving a cooling fluid for cooling said first and second bus bars, respectively.

9. A device for connecting a capacitor between a first and a second bus bar, comprising:

said first and second bus bars being located in a parallel spaced apart relationship;

a first and a second threaded bore in said first and second bus bars, respectively;

a first and a second channel defined in said first and second bus bars for receiving a cooling fluid for cooling said first and second bus bars, respectively;

said capacitor having a first and a second electrode separated by a dielectric;

a first and a second aperture extending through said first and second electrodes, respectively; and a first and a second threaded bolt extending through said first and second apertures for threadably engaging with said first and second threaded bores of said first and second bus bars for securing said first and second electrodes of said capacitor to said first and second bus bars to provide electrical and thermal conduction between said capacitor and said bus bars.

10. A device for connecting a capacitor between a first and a second bus bar as set forth in claim 9, wherein each of said first and second bus bars is formed from a thermally and electrically conductive metal.

11. A device for connecting a capacitor between a first and a second bus bar as set forth in claim 9, wherein said first and said second electrode directly engage said first and said second bus bar, respectively.

12. A device for connecting a capacitor between a first and a second bus bar as set forth in claim 9, wherein each of said first and second electrodes is a solid metallic electrodes.

* * * * *

UNITED STATES PATENT AND TRADEMARK OFFICE
CERTIFICATE OF CORRECTION

PATENT NO.   : 5,953,201
DATED        : September 14, 1999
INVENTOR(S)  : Albert Jakoubovitch It is certified that error appears in the above-identified patent and that said Letters Patent is hereby corrected as shown below:

Column 1, line 40, delete "dominates" and insert --eliminates--

Column 2, line 13, delete "bas" and insert --bars--

Column 2, line 33, delete "bare" and insert --bore--

Column 4, line 64, after "electrodes" insert --; and a dielectric element located between said first and second solid metallic electrodes.--

Signed and Sealed this

Thirty-first Day of October, 2000

Attest:

Q. TODD DICKINSON

*Attesting Officer*    *Director of Patents and Trademarks*